(12) United States Patent
Hubinette (10) Patent No.: US 8,572,115 B2
(45) Date of Patent: Oct. 29, 2013

(54) IDENTIFYING NEGATIVE KEYWORDS ASSOCIATED WITH ADVERTISEMENTS

(75) Inventor: Carl F. Hubinette, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/493,507

(22) Filed: Jun. 11, 2012

(65) Prior Publication Data

US 2012/0246016 A1   Sep. 27, 2012

Related U.S. Application Data

(63) Continuation of application No. 11/736,452, filed on Apr. 17, 2007, now Pat. No. 8,229,942.

(51) Int. Cl.
    *G06F 17/30* (2006.01)
(52) U.S. Cl.
    USPC ........... 707/769; 707/758; 707/759; 707/713; 707/722; 707/736; 707/771; 707/773; 707/766
(58) Field of Classification Search
    USPC ......... 707/769, 758, 759, 713, 722, 736, 771, 707/773, 766
    See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,778,363 A | 7/1998 | Light |
| 5,848,397 A | 12/1998 | Marsh et al. |
| 5,948,061 A | 9/1999 | Merriman et al. |
| 6,026,368 A | 2/2000 | Brown et al. |
| 6,044,376 A | 3/2000 | Kurtzman |
| 6,076,082 A | 6/2000 | Kindo |
| 6,078,914 A | 6/2000 | Redfern |
| 6,094,653 A | 7/2000 | Li et al. |
| 6,144,944 A | 11/2000 | Kurtzman et al. |
| 6,167,382 A | 12/2000 | Sparks et al. |
| 6,269,361 B1 | 7/2001 | Davis et al. |
| 6,401,075 B1 | 6/2002 | Mason et al. |
| 6,401,096 B1 | 6/2002 | Zellweger |
| 6,405,188 B1 | 6/2002 | Schwartz et al. |
| 6,745,180 B2 | 6/2004 | Yamanoue |
| 6,816,857 B1 | 11/2004 | Weissman et al. |
| 6,961,756 B1 * | 11/2005 | Dilsaver et al. ............... 709/205 |

(Continued)

FOREIGN PATENT DOCUMENTS

WO   WO9721183 A1   6/1997

OTHER PUBLICATIONS

AdForce, Inc., A Complete Guide to AdForce, Version 2.6, 1998.
AdForce, Inc., S-1/A SEC Filing, May 6, 1999.

(Continued)

*Primary Examiner* — Frantz Coby
(74) *Attorney, Agent, or Firm* — Fish & Richardson P.C.

(57) ABSTRACT

REVISE this to be consistent with the new claim 1 . . . The present disclosure includes a system and method for identifying negative keywords associated with advertisements. In some implementations, a method for advertising includes identifying one or more keywords associated with an advertisement. The keywords used to embed the advertisement in web pages such as those including search results. By identifying, from the plurality of search criterion, a subset of search criterion as being off-topic to the advertisement item, one or more negative keywords may be derived from the subset of off-topic search criterion in order to limit the embedding of non-relevant advertisements in web page content.

33 Claims, 6 Drawing Sheets

(56) References Cited

U.S. PATENT DOCUMENTS

| | | | |
|---|---|---|---|
| 6,985,882 B1 | 1/2006 | Del Sesto | |
| 7,039,599 B2 | 5/2006 | Merriman et al. | |
| 7,136,875 B2 | 11/2006 | Anderson et al. | |
| 7,162,468 B2 | 1/2007 | Schwartz et al. | |
| 7,181,438 B1 | 2/2007 | Szabo | |
| 7,268,823 B2* | 9/2007 | Mitts et al. | 348/465 |
| 7,383,258 B2 | 6/2008 | Harik et al. | |
| 7,406,465 B2 | 7/2008 | Jones et al. | |
| 7,487,145 B1* | 2/2009 | Gibbs et al. | 1/1 |
| 7,593,921 B2 | 9/2009 | Goronzy et al. | |
| 7,739,295 B1* | 6/2010 | Agrawal et al. | 707/768 |
| 7,774,333 B2 | 8/2010 | Colledge et al. | |
| 7,801,899 B1 | 9/2010 | Spitkovsky | |
| 7,831,472 B2 | 11/2010 | Yufik | |
| 7,899,759 B1* | 3/2011 | Heggem | 705/500 |
| 8,024,345 B2 | 9/2011 | Colledge et al. | |
| 8,046,347 B2* | 10/2011 | Joshi | 707/706 |
| 8,046,529 B2* | 10/2011 | Lam | 711/103 |
| 8,050,983 B1* | 11/2011 | Eakin et al. | 705/26.35 |
| 8,135,712 B1* | 3/2012 | Coladonato et al. | 707/730 |
| 8,209,317 B2* | 6/2012 | Joshi | 707/706 |
| 8,229,942 B1* | 7/2012 | Hubinette | 707/759 |
| 8,229,949 B2* | 7/2012 | Yamasaki et al. | 707/766 |
| 8,290,949 B2* | 10/2012 | Baker et al. | 707/736 |
| 2002/0059219 A1 | 5/2002 | Neveitt | |
| 2002/0099676 A1 | 7/2002 | Kindo | |
| 2002/0138478 A1 | 9/2002 | Schwartz et al. | |
| 2002/0156917 A1 | 10/2002 | Nye | |
| 2002/0174101 A1 | 11/2002 | Fernley et al. | |
| 2004/0220900 A1 | 11/2004 | Yang et al. | |
| 2004/0236725 A1 | 11/2004 | Amitay et al. | |
| 2004/0249804 A1 | 12/2004 | Nakayama et al. | |
| 2004/0267723 A1 | 12/2004 | Bharat | |
| 2005/0086219 A1 | 4/2005 | Martin | |
| 2005/0114198 A1 | 5/2005 | Koningstein et al. | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0165766 A1 | 7/2005 | Szabo | |
| 2006/0026152 A1 | 2/2006 | Zeng et al. | |
| 2006/0129534 A1 | 6/2006 | Jones et al. | |
| 2006/0161534 A1 | 7/2006 | Carson et al. | |
| 2006/0173744 A1 | 8/2006 | Kandasamy et al. | |
| 2006/0206479 A1 | 9/2006 | Mason | |
| 2006/0206516 A1 | 9/2006 | Mason | |
| 2006/0229942 A1 | 10/2006 | Miller et al. | |
| 2006/0248078 A1* | 11/2006 | Gross et al. | 707/5 |
| 2007/0027750 A1 | 2/2007 | Chou | |
| 2007/0050356 A1 | 3/2007 | Amadio | |
| 2007/0067215 A1 | 3/2007 | Agarwal et al. | |
| 2007/0174118 A1 | 7/2007 | Dekel et al. | |
| 2007/0288454 A1 | 12/2007 | Bolivar et al. | |
| 2008/0046917 A1* | 2/2008 | de Heer | 725/32 |
| 2008/0052152 A1 | 2/2008 | Yufik | |
| 2008/0109285 A1 | 5/2008 | Reuther et al. | |
| 2008/0154723 A1* | 6/2008 | Ferguson et al. | 705/14 |
| 2008/0228699 A1 | 9/2008 | Kenedy et al. | |
| 2008/0256034 A1 | 10/2008 | Chang et al. | |
| 2009/0043741 A1* | 2/2009 | Kim | 707/3 |
| 2010/0036726 A1 | 2/2010 | Gallet | |
| 2010/0223125 A1 | 9/2010 | Spitkovsky | |
| 2011/0040791 A1 | 2/2011 | Kenedy et al. | |
| 2011/0078168 A1 | 3/2011 | Kenedy et al. | |
| 2012/0066069 A1* | 3/2012 | Ferguson et al. | 705/14.64 |
| 2012/0166182 A1* | 6/2012 | Ko et al. | 704/9 |

OTHER PUBLICATIONS

AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 6,446,045 B1, Control No. 95/001,061.
Request for Reexamination of U.S. Patent No. 6,829,587 B2, Control No. 95/001,068.
Request for Reexamination of U.S. Patent No. 7,249,059 B2, Control No. 95/001,069.
Request for Reexamination of U.S. Patent No. 7,240,025 B2, Control No. 95/001,073.
"Positives of the Negative: Using negative keywords to enhance your campaign's performance | PPC Hero (R)" dated Mar. 30, 2007. Downloaded from http://www.ppchero.com/positives-of-the-negative-keywords-to-enhance-your-campaign's-performance/ on Mar. 28, 2012, 3 pages.
Office Action issued in U.S. Appl. No. 11/736,452 on Apr. 16, 2009, 27 pages.
Office Action issued in U.S. Appl. No. 11/736,452 on Nov. 17, 2009, 27 pages.
Office Action issued in U.S. Appl. No. 11/736,452 on Aug. 12, 2010, 16 pages.
Office Action issued in U.S. Appl. No. 11/736,452 on Apr. 1, 2011, 9 pages.
Notice of Allowance issued in U.S. Appl. No. 11/736,452 on Aug. 22, 2011, 8 pages.
Notice of Allowance issued in U.S. Appl. No. 11/736,452 on Apr. 9, 2012, 10 pages.
Office Action issued in U.S. Appl. No. 11/736,448 on Apr. 15, 2009, 22 pages.
Office Action issued in U.S. Appl. No. 11/736,448 on Nov. 17, 2009, 27 pages.
Office Action issued in U.S. Appl. No. 11/736,448 on Aug. 3, 2010, 28 pages.
Office Action issued in U.S. Appl. No. 11/736,448 on Nov. 17, 2010, 25 pages.
Notice of Allowance issued in U.S. Appl. No. 11/736,448 on May 27, 2011, 6 pages.
Notice of Allowance issued in U.S. Appl. No. 11/736,448 on Aug. 31, 2011, 11 pages.
Office Action issued in U.S. Appl. No. 13/332,999 on Mar. 14, 2012, 19 pages.
Notice of Allowance issued in U.S. Appl. No. 13/332,999 on Oct. 15, 2012, 10 pages.
Notice of Allowance issued in U.S. Appl. No. 13/332,999 on Apr. 9, 2013, 12 pages.

* cited by examiner

IDENTIFYING NEGATIVE KEYWORDS ASSOCIATED WITH ADVERTISEMENTS

CROSS-REFERENCE TO RELATED APPLICATION

This application is a continuation of U.S. patent application Ser. No. 11/736,452, filed on Apr. 17, 2007, which is herein incorporated by reference in its entirety.

TECHNICAL FIELD

This invention relates to advertising.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. When an Internet user accesses these respective services, the content provided by the service is typically related to a particular topic that can, for example, be divided up into various content categories. By determining the category of content provided to an internet user on a particular service, a service provider can give the Internet user additional content and/or advertisements focused on the category desired by the user, thus improving the user's experience.

For example, on the Internet some content providers include search functionality that is based on keywords entered by the user seeking information. This user query can be an indicator of the type of information of interest to the user. By comparing the user query to a list of keywords specified by an advertiser, it is possible to provide targeted ads to the user. An example of such a system is AdWords™ offered by Google, Inc. (Mountain View, Calif.). An example of such a system is described in part in U.S. Pat. No. 6,816,857, entitled "Meaning-based advertising and document relevance determination," issued Nov. 9, 2004, currently assigned to the assignee of the present application and which is hereby incorporated by reference in its entirety.

Alternatively, a content provider can serve advertisements to a user based on a determination of an advertisement most closely related to Internet content such as a web page. This can be done, for example, by associating the content of the web page to a set of one or more advertising keywords closely related to the page content, and serving targeted ads to a user of that web page. An example of such as a system is the AdSense™ system offered by Google, Inc. (Mountain View, Calif.). An example of such a system is in part described in U.S. Pat. No. 7,136,875, entitled "Serving advertisements based on content," issued Nov. 14, 2006 to the assignee of the present application and which is hereby incorporated by reference in its entirety.

Further improvement in the targeting of advertisements to content are possible, especially when keywords are broad and can relate to multiple possible topics of interest to a user and an advertiser.

SUMMARY

The present disclosure includes a system and method for identifying negative keywords associated with a content item (e.g., an advertisement or "ad"). In some implementations, a method for advertising includes identifying one or more keywords (such as those derived from search queries or web page content, for example) associated with an advertisement with respect to content. A function is applied to query to compute whether the query is irrelevant to the advertisement and a score is applied to the query. Through the resulting scores, a list of exclusion keywords is determined that represent content items such as advertisements not to be included in results while matching a substantially minimal the number of relevant queries In this manner, one or more search criteria associated with the one or more keywords are evaluated to identify one or more negative keywords.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
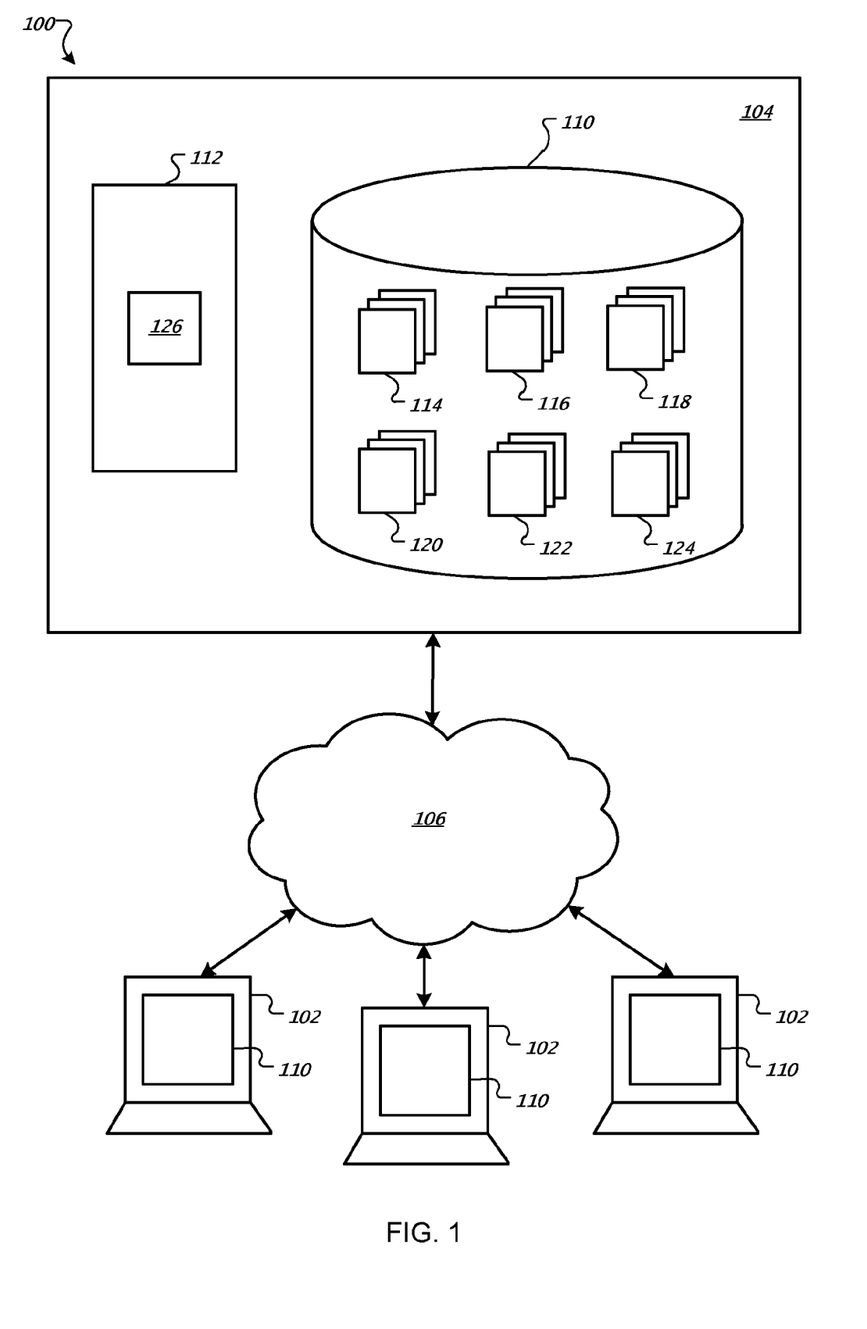
FIG. 1 is a block diagram illustrating an example system for identifying negative keywords in accordance with some implementations of the present disclosure.

FIG. 1 is a block diagram illustrating an example system 100 for automatically identifying negative keywords associated with a content item (e.g., an advertisement or "ad"). By way of example, systems and methods disclosed herein are discussed with reference to the identification of negative keywords associated with an on-line advertisement. The systems and methods disclosed can be used in alternative delivery channels (e.g., not on-line, such as radio) and include other content (e.g., not ads). Negative keywords can include character strings (e.g., words, phrases) in search criteria that negate or otherwise reduce the likelihood that an associated advertisement is selected for display with the corresponding search results. Frequently, advertisements presented with search results are associated with keywords such that the inclusion of one or more keywords in the search criteria results or otherwise increases a likelihood that the advertisement is presented with the search results. In comparison, negative keywords can, alternatively or in combination, be associated with the advertisement such that the inclusion of one or more negative keywords in the search criteria prevents or otherwise reduces the likelihood that the advertisement is presented with the search results. For example, an advertisement for a window cleaning service can include the keyword "clean windows." To reduce, minimize, or decrease presenting the ad with unrelated search results, the word "Microsoft" can be a negative keyword for the advertisement thereby reducing the likelihood that a window cleaning service is advertised with search results related to the Windows operating system. As a result of automatically identifying negative keywords, the system 100, in some implementations, can thus be used with an advertising service to enhance, maximize, or otherwise increase the relevancy of ads presented with search results. In doing so, the system 100 can increase actions rates (e.g., click-through rates) and/or conversions performed in response to presenting the ad.

In some implementations, the system 100 performs one or more of the following: identifying search criteria that can result in presentation of an ad, determining whether search criteria is relevant to the ad, identifying negative keywords in the unrelated search criteria, and/or others. In regards to identifying search criteria, the system 100 can identify a search query that matches keywords associated with the advertisement. For example, the ad can be associated with words and/or phrases, and the system 100 can identify the search criteria that include, match, or otherwise map to at least one of these words and/or phrases. In determining the relevancy of search criteria, the system 100 can determine the relevancy of keywords to an advertisement using any suitable expression such as Bayesian networks. Search criteria determined to be substantially irrelevant to an advertisement may be identified as off-topic queries. After identifying search criteria not relevant to the ad, the system 100 can determine words that occur with a specified frequency within the search criteria as negative keywords. For example, if the system 100 identifies queries "apple tree," "pear tree," and "pecan tree" as irrelevant queries, the system 100 can identify the word "tree" as a negative keyword. In some implementations, the system 100, after identifying off-topic queries, may determine subsets of terms that reoccur in one or more off-topic search criteria and identify those subsets as negative keywords. Other examples are possible.

Turning to a high level description of the example implementation, the system 100 includes clients 102*a*-*c* coupled to keyword server 104 through a network 106. In this implementation, the client 102 includes a Graphical User Interface (GUI) 108 for displaying information associated with negative keywords provided by the keyword server 104. The keyword server 104 includes a memory 110 and a processor 112. The memory 110 locally stores a keyword file 114 identifying terms associated with advertisements, associated query files 116 identifying search criteria that can lead to impressions of the advertisements, off-topic queries 118 identifying search criteria substantially irrelevant to the advertisements, models 120 for mapping terms to clusters of related terms, evaluation criteria 122 (typically from user input) identifying criteria for determining off-topic queries using the models 120 and negative keywords using these off-topic queries, and negative keywords 124 identifying negative keywords associated with advertisements. Turning to a high level description of the operation of the system 100, the evaluation engine 126 determines clusters of related terms associated with keyword files 114 and clusters of related terms associates with the associated query files 116 using the models 120. Using the keyword clusters and the query clusters, the evaluation engine 126 determines the off-topic queries 118 using the evaluation criteria 122, such as evaluation criteria obtained from user input. In some implementations, the evaluation engine 126 determines negative keywords 124 based, at least in part, on the off-topic queries 118 and the evaluation criteria 122 such as from user input.

As for a description of the illustrated elements, each client 102 includes or executes at least a GUI 108 and comprises an electronic device (e.g., computing device) operable to receive, transmit, process and store any appropriate data associated with system 100. It will be understood that there can be any number of clients 102 communicably coupled to the keyword server 104. Further, "client 102" and "user" can be used interchangeably as appropriate without departing from the scope of this disclosure. Moreover, for ease of illustration, each client 102 is described in terms of being used by one user. But this disclosure contemplates that many users can use one computer or that one user can use multiple computers.

The keyword server 104 includes a memory 110 and a processor 112. The memory 110 can be a local memory and include any memory or database module and can take the form of volatile or non-volatile memory including, without limitation, magnetic media, optical media, random access memory (RAM), read-only memory (ROM), removable media, or any other suitable local or remote memory component. In the illustrated implementation, the memory 110 locally stores keyword files 114, associated query files 116, off-topic queries 118, models 120, evaluation criteria 122 (typically from user input), and negative keywords 124. Local memory 110 can also include any other appropriate data, such as VPN applications or services, firewall policies, a security or access log, print or other reporting files, HTML files or templates, data classes or object interfaces, software applications or sub-systems, and others.

The keyword file 114 can include any parameters, variables, algorithms, instructions, rules, objects, or other directives for associating terms and/or phrases with one or more advertisements. In doing so, the keyword file 114 indicates that the associated network ad can be available to present with, for example, search results. Often, an advertiser provides terms and/or phrases related to the goods or services associated with the advertisement. In doing so, a search request including or otherwise associated with the keywords can lead to an impression of the associated advertisement with the search results. In some implementations, the keyword file 114 can be associated with a single advertisement, multiple advertisements, and/or a topic associated with a good and/or service. In some implementations, multiple advertisements can be associated with a single keyword file 114. In certain implementations, the keyword file 114 can be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In short, keyword file 114 can comprise one table or file or a plurality of tables or files stored on one computer or across a plurality of computers in any appropriate format. Indeed, some or all of keyword file 114 can be local or remote without departing from the scope of this disclosure and store any type of appropriate data.

The associated query files 116 includes entries and/or one or more data structures identifying search criteria associated with keyword files 114. For example, the associated query files 116 can include search criteria that map to or are otherwise associated with keywords of an advertisement. In some implementations, the associated query files 116 include search criteria matching one or more keywords associated with an advertisement. In some implementations, the associated query files 116 can include terms and/or phrase indicative, similar, analogous, related, or otherwise associated with one or more keyword files 114. Processes for identifying such queries are discussed in more detail with respect to FIGS. 2 and 3. In some implementations, multiple associated query files 116 can be associated with a single advertisement, multiple advertisements, and/or a topic associated with a good and/or service. In some implementations, multiple advertisements can be associated with a single associated query file 116. In certain implementations, the associated query file 116 can be formatted, stored, or defined as various data structures in text files, XML documents, VSAM files, flat files, Btrieve files, CSV files, internal variables, or one or more libraries. In short, the associated query file 116 can comprise one table or file or a plurality of tables or files stored on one computer or across a plurality of computers in any appropriate format. Indeed, some or all of associated query files 116 can be local or remote without departing from the scope of this disclosure and store any type of appropriate data.

Based, at least in part, on the associated query files 116, the off-topic query files 118 include entries and/or one or more data structures identifying search criteria that are substantially irrelevant to advertised goods and/or services. For example, the off-topic query file 118 can identify the search criteria for "Windows operating system" as substantially irrelevant to a "window cleaning service". In some implementations, the off-topic query files 118 can include terms and/or phrases that do not match a topic of an advertisement. In some implementations, the off-topic query files 118 can be associated with a single advertisement, multiple advertisements, and/or a topic associated with a good and/or service. In some implementations, multiple advertisements can be associated with a single off-topic query file 118. In certain implementations, the off-topic query files 118 can be formatted, stored, or defined as various data structures in text files, XML documents, VSAM files, flat files, Btrieve files, CSV files, internal variables, or one or more libraries. In short, the off-topic query files 118 can comprise one table or file or a plurality of tables or files stored on one computer or across a plurality of computers in any appropriate format. Indeed, some or all of off-topic query files 118 can be local or remote without departing from the scope of this disclosure and store any type of appropriate data.

The models 120 include can include any parameters, variables, algorithms, instructions, rules, objects, or other directives mapping terms and/or phrases to other indicative, similar, analogous, related, or otherwise associated with terms and/or phrases. For example, a model 120 can include information mapping baseball to a cluster, i.e., a group of related terms, that include mitt, bat, hit, run, double, and others. In some implementations, the models 120 merely define or otherwise identify a set of related terms. In this case, a model 120 can be intended to describe a topic and/or semantic concept (e.g., words related to baseball). In addition to terms, the models 120 can include compound words, phrases, and other elements (e.g., a technical paper, a website). In some implementations, the models 120 can be associated with a single topic or multiple topics. In some implementations, multiple topics can be associated with a single model 120. In certain implementations, the models 120 can be formatted, stored, or defined as various data structures in text files, XML documents, VSAM files, flat files, Btrieve files, CSV files, internal variables, or one or more libraries. In short, the models 120 can comprise one table or file or a plurality of tables or files stored on one computer or across a plurality of computers in any appropriate format. Indeed, some or all of models 120 can be local or remote without departing from the scope of this disclosure and store any type of appropriate data.

Evaluation criteria 122 include any parameters, variables, algorithms, instructions, rules, objects or other directives for evaluating search criteria for relevance to advertisements, and is typically based on user input. In some implementations, the evaluation criteria based on user input 122 can be used to identify directives for performing one or more of the following: determining relevancy of search criteria; and determining confidence that a subset of an off-topic query is a negative keyword. In regards to relevancy, the evaluation criteria 122 can identify directives for determining a score associated with search criteria indicating relevance of the search terms to an advertisement. In some implementations, the evaluation criteria 122 can include mathematical and/or logic expressions for determining a relevance score associated with search criteria. For example, the evaluation criteria 122 can include a mathematical expression for determining a conditional probability associated with a user inputted search query or search criteria. In this case, the expression can determine the probably that search criteria occurs within one or more clusters associated with a topic of an advertisement. In the case that the model 120 maps keywords to a set of clusters, the evaluation criteria can include an expression to determine the probability that a term in a search criteria occurs in the set of clusters. In the case that C denotes the set of clusters, the probability of a term can be expressed as P(word|C). In some implementations, P(word|C) corresponds to P(word|on-topic), which can represent the probability that the term is associated with the topic. Based, at least in part, on P(word|C), the following expression can be used as a scoring method for a set of K words in a search criteria:

$$\text{Score}(K \mid C) = \frac{1}{|K|} \sum_K \log\left(\frac{P(K_n \mid C)}{1 - P(K_n \mid C)}\right)$$

In some implementations, this expression substantially determines an average logarithmic odds that a word occurs in a set of clusters associated with a topic of an advertisement. In this example, P(word|C) increases for words that occur with greater frequency in the associated clusters, and accordingly, Score(K|C) also increases. In some implementations, the computed score can be compared with the probability that the keywords associated with an advertisement occurs in the set of clusters, which can be expressed as P(Keywords Associated with an Ad|C). In one example, the relevance can be determined by the difference as expressed in the following equation:

Relevance(Q|C)=Score(Q|C)−Score(Keywords Associated with an Ad|C)

In this example, the relevance of search criteria is determined by the difference in the logarithmic probabilities between search criteria and keywords of an advertisement. In addition, the evaluation criteria 122 can include logical expressions for comparing the determined relevance to one or more parameters. For example, the evaluation criteria 122 can identify an off-topic value such that a relevance score below this value indicates that the search query is not associated with the topic of the advertisement. Also, the evaluation criteria 122 can include a value such that a relevance score above this value indicates that the search query is associated with the topic of the advertisement. The above expressions are merely examples for determining the relevance of search criteria to a topic associated with an advertisement. Accordingly, other mathematical and/or logical expressions can be used to determine relevancy without departing from the scope of this disclosure. In some implementations, the evaluation criteria 122 can identify those search criteria that are not relevant to the topic as negative keywords for the associated advertisement. Such search criteria can be redundant and/or interfere with presenting ads with associated search results. The evaluation criteria 122 can include expressions to identify terms and/or phrases within the off-topic search criteria.

In addition, the evaluation criteria 122 can include expressions to identify subsets in off-topic queries as negative keywords. In some implementations, the evaluation criteria 122 can include the following expression to determine the importance of off-topic queries:

$$\text{Confidence}(Q \mid C) = 1 - e^{MaxOffTopicRelevance - Relevance(Q|C)}$$

$$\text{AdjustedConfidence}(Q \mid C) =$$
$$\begin{cases} \text{Confidence}(Q \mid C)^{LowConfidenceExponent} & \text{if Confidence}(Q \mid C) > 0 \\ \text{Confidence}(Q \mid C) & \text{otherwise} \end{cases}$$

$$\text{Importance}(Q|C) = Q_{hits} * \text{AdjustedConfidence}(Q|C)$$

As indicated in the expressions, the importance can be determined by multiplying a number representing the confidence that a particular search query is not relevant to the keywords of an advertisement by the amount of impressions associated with the keywords of an advertisement. In addition, the low-confidence scores can be further reduced by using an exponent. In the example, the evaluation criteria 122 can include a parameter for the exponent identified as LowConfidenceExponent in the case when the confidence is greater than zero. In this expression, a negative confidence can mean that the search query can be relevant to the keywords of an advertisement. In connection with determining the importance for off-topic search criteria, the evaluation criteria 122 may include directives for identifying subsets in each search query and summing the associated importance for each occurrence of the subset in the identified off-topic searches. In addition, the evaluation criteria 122 may include directives for assigning subsets with the highest importance or an importance above a threshold as negative keywords. As for thresholds, the evaluation criteria 122 may include, for example, a proximity threshold indicating proximity of a subset to a topic. The above expressions are merely examples for determining the importance of subsets included in search criteria as negative keywords. Accordingly, other similar mathematical and/or logical expressions can be used to determine importance without departing from the scope of this disclosure. In other implementations, the evaluation criteria 122 can be formatted, stored, or defined as various data structures in text files, XML documents, VSAM files, flat files, Btrieve files, CSV files, internal variables, or one or more libraries. In short, the evaluation criteria 122 can be stored to comprise one table or file or a plurality of tables or files stored on one computer or across a plurality of computers in any appropriate format. Moreover, evaluation criteria 122 can be local or remote without departing from the scope of this disclosure and store any type of appropriate data.

The negative keyword files 124 can include entries and/or one or more data structures identifying negative keywords associated with advertisements. As mentioned above, negative keywords can include terms, compounds, phrases, and/or other character strings that prevent or decrease the likelihood that an advertisement is presented with search results. For example, the negative keyword file 124 may include negative keywords such that search criteria that includes one or more of the negative keywords may prevent an associated advertisement being presented with the search results. In some implementations, the negative keyword file 124 can be associated with a single advertisement, multiple advertisements, and/or a topic associated with a good and/or service. In some implementations, multiple advertisements can be associated with a single negative keyword file 124. In certain implementations, the negative keyword file 124 can be formatted, stored, or defined as various data structures in text files, XML documents, VSAM files, flat files, Btrieve files, CSV files, internal variables, or one or more libraries. In short, the negative keyword file 124 can comprise one table or file or a plurality of tables or files stored on one computer or across a plurality of computers in any appropriate format. Indeed, some or all of negative keyword file 124 can be local or remote without departing from the scope of this disclosure and store any type of appropriate data.

The processor 112 executes instructions and manipulates data to perform operations of the server 104. Although FIG. 1 illustrates a single processor 112 in server 104, multiple processors can be used according to particular needs, and reference to processor 112 is meant to include multiple processors 112 where applicable. In the illustrated implementation, processor 112 executes evaluation engine 126 at any appropriate time such as, for example, in response to a request or input from a user of server 104 or any appropriate computer system coupled with network 106. Evaluation engine 126 can include any software, hardware, and/or firmware, or combination thereof, operable to evaluate search criteria for negative keywords for advertisements. In evaluating search criteria, the evaluation engine 126 may identify a keyword file 114 and an associated query file 116 for an advertisement and map the keyword and queries to a set of related clusters using one or more models 120. Using the keyword clusters and the query clusters, the evaluation engine 126 may determine one or more search criteria that are not associated with a topic of the advertisement using the evaluation criteria 122. In identifying off-topic search criteria, the evaluation engine 126 can perform one or more calculations using the evaluation criteria 122. For example, the evaluation engine 126 can determine relevance scores associated with search criteria. A score can be assigned based, at least in part, on proximity to a topic associated with an advertisement. In connection with identifying off-topic search criteria, the evaluation engine 126 may identify subsets in the off-topic search criteria as negative keywords. In response to at least identifying the negative keywords, the evaluation engine 126 can generate or update one or more negative keyword files 124.

Regardless of the particular implementation, "software" can include software, firmware, wired or programmed hardware, or any combination thereof as appropriate. Indeed, evaluation engine 126 can be written or described in any appropriate computer language including C, C++, Java, J#, Visual Basic, assembler, Perl, PHP, as well as others. It will be understood that while the evaluation engine 126 is illustrated in FIG. 1 as including individual modules, the evaluation engine 126 can include numerous other sub-modules, or can instead be a single multi-tasked module that implements the various features and functionality through various objects, methods, or other processes. Further, while illustrated as internal to the keyword server 104, one or more processes associated with the evaluation engine 126 can be stored, referenced, or executed remotely. Moreover, the evaluation engine 126 can be a child or sub-module of another software module or enterprise application (not illustrated) without departing from the scope of this disclosure.

The network 106 facilitates wireless or wireline communication between the keyword server 104 and any other local or remote computer, such as the client 102. The network 106 can be all or a portion of an enterprise or secured network. While illustrated as single network, the network 106 can be a continuous network logically divided into various sub-nets or virtual networks without departing from the scope of this disclosure, so long as at least portion of the network 106 can facilitate communications of the ads 116 between the keyword server 104 and the client 102. In some implementations, the network 106 encompasses any internal or external network, networks, sub-network, or combination thereof operable to facilitate communications between various components in the system 100. The network 106 can communicate, for example, Internet Protocol (IP) packets, Frame Relay frames, Asynchronous Transfer Mode (ATM) cells, voice, video, data, and other suitable information between network addresses. The network 106 can include one or more local area networks (LANs), radio access networks (RANs), metropolitan area networks (MANs), wide area networks (WANs), all or a portion of the global computer network known as the Internet, and/or any other communication system or systems at one or more locations.

As an example, an ad for a window cleaning service can advertise using the following keyword phrases: window washer, window cleaner, or tall building window washer. The system 100 can identify, using these initial keywords, a list of queries which can result in the window cleaning service advertisement being presented. For example, the query phrases window washer, window cleaner, window registry cleaner or window washer service can lead to ad impressions when displaying search results. The system 100 can then use evaluation criteria 122 to score the above queries using, for example, various functions. For example, the query phrases window washer, window cleaner, or window washer service can be scored high, whereas the query phrase window registry cleaner is scored low because the content is unrelated to the topic of the advertisement. Thereafter, the system 100 can determine negative keywords 124 using these scores. In addition, the system 100 may identify subsets of words (phrases etc.) associated with the negative keywords 124 using the evaluation criteria 122. In this example, an identified negative keyword 122 can be registry.

Figure 2:
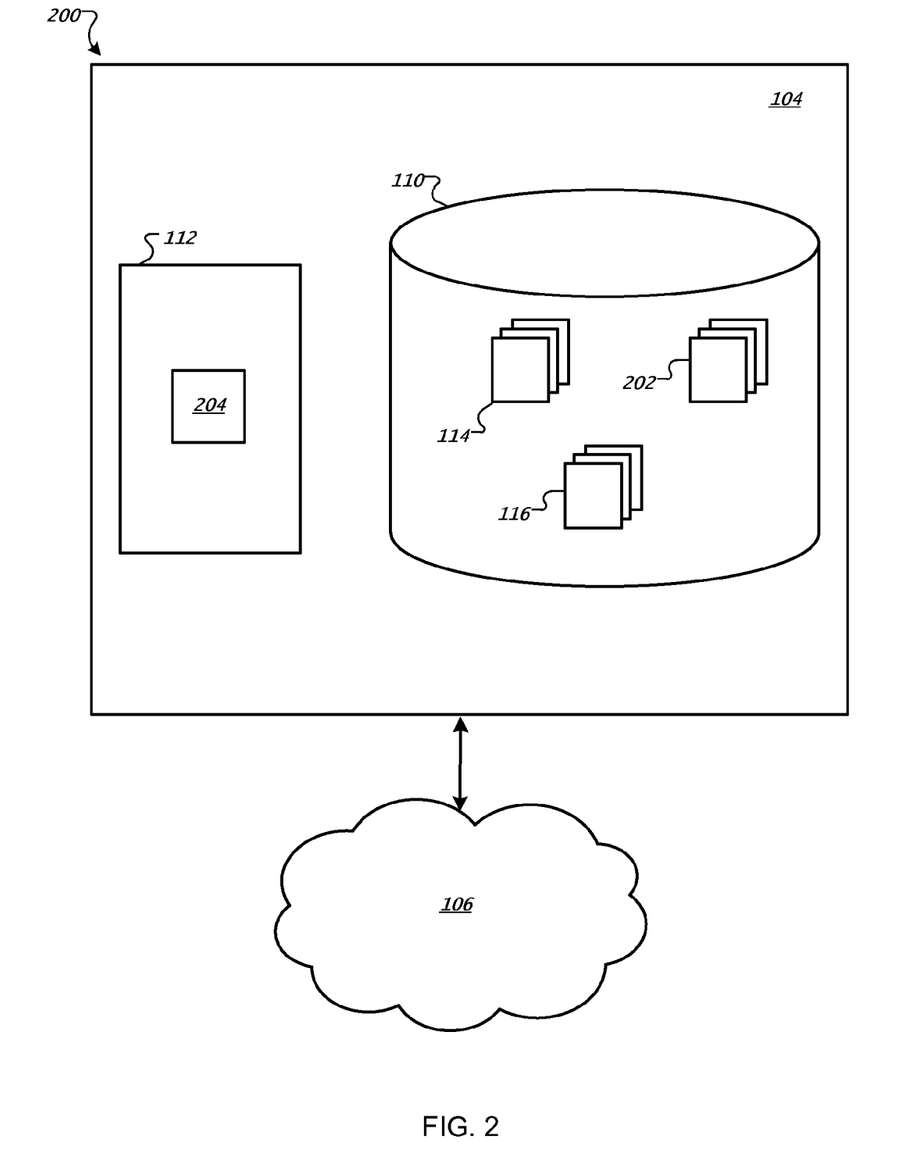
FIG. 2 is a block diagram illustrating an example system for identifying associated search criteria in accordance with some implementations of the present disclosure.
Figure 3:
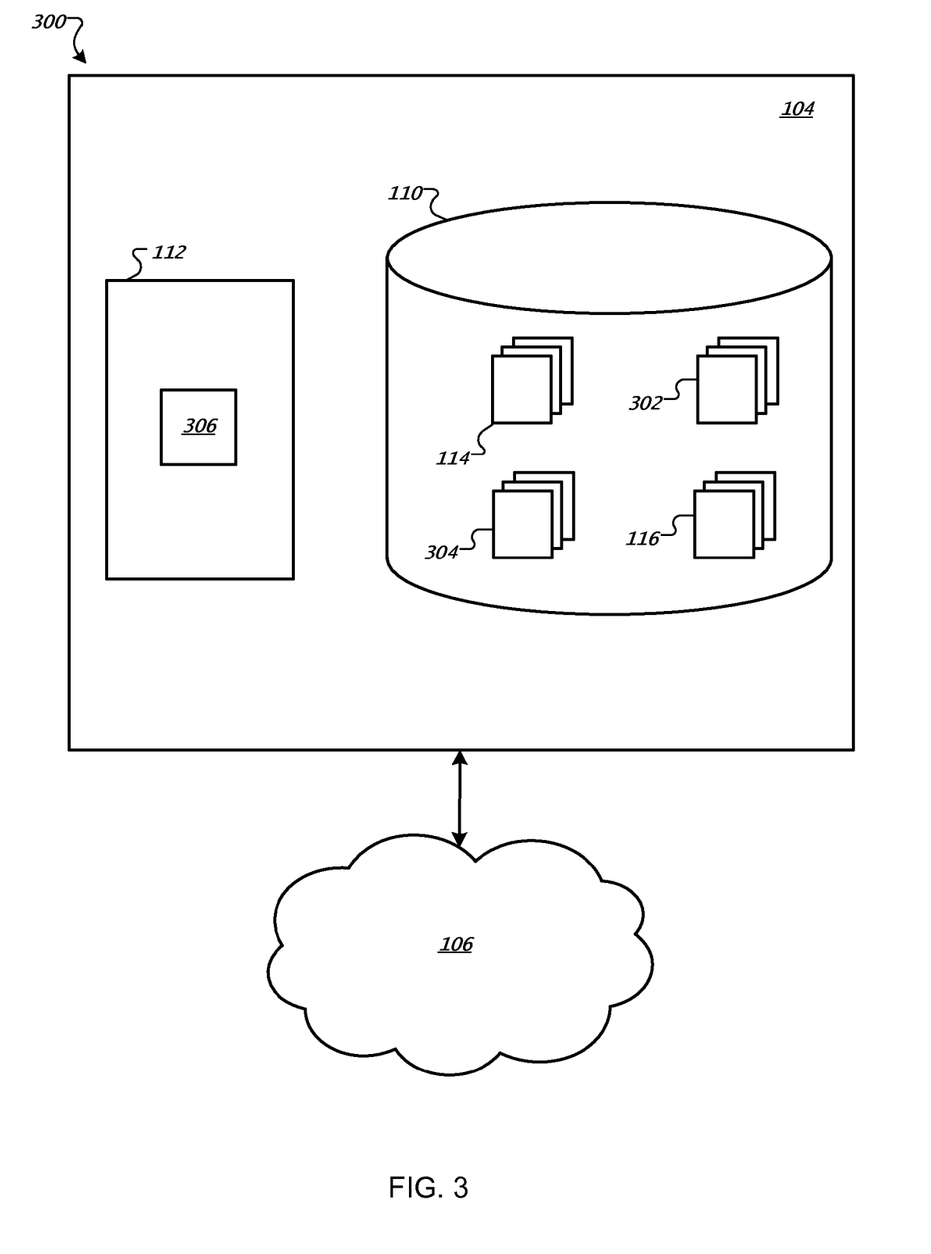
FIG. 3 is a block diagram illustrating another example system for identifying associated search criteria in accordance with some implementations of the present disclosure.

FIGS. 2 and 3 illustrate an example system 200 and 300, respectively, for automatically identifying queries associated with keywords of an advertisement. In the illustrated examples, the system 200 identifies queries resulting in impressions of the advertisement, and the system 300 identifies associated queries independent of such historical data. While illustrated as separate systems, the features and functions of the illustrated systems 200 and 300 can be combined without departing from the scope of this disclosure.

Referring to FIG. 2, the system 200 can use prior search criteria to identify a subset of queries resulting in the impression an advertisement. In combination with some of the elements in FIG. 1, the memory 110 includes search log files 202 for identifying previous searches and the processor 112 includes a query engine 204 for identifying associated queries using the search log files 202. The search log files 202 include one or more data structures or entries that identify or include prior search criteria and associated ad impressions. For example, the search log file 202 can include or identify search criteria and ads displayed with the associated search results. In some implementations, the search log files 202 can be formatted, stored, or defined as various data structures in text files, XML documents, VSAM files, flat files, Btrieve files, CSV files, internal variables, or one or more libraries. In short, the log files 202 can comprise one table or file or a plurality of tables or files stored on one computer or across a plurality of computers in any appropriate format. Moreover, the log files 202 can be local or remote without departing from the scope of this disclosure and store any type of appropriate data.

The query engine 204 can include any software, hardware, and/or firmware operable to identify search criteria resulting in ad impressions. For example, the query engine 204 may identify search criteria in the log files 202 that can result in the impression of an advertisement. In some implementations, the query engine 204 identifies search criteria that includes one or more keywords of the advertisement. Alternatively or in combination, the query engine 204 identifies search criteria related to the one or more keywords of the advertisement. For example, the search criteria may include terms that are similar, analogous, related to the same topic, or otherwise associated with one or more keywords of the advertisement. The query engine 204 may limit the evaluation of search criteria to a certain period of time (e.g., 30 days).

In one aspect of operation, the query engine 204 identifies one or more log files 202 associated with a period of time. The query engine 204 identifies those search criteria that resulted in impressions of an advertisement. Based, at least in part, on the identified search criteria, the query engine 204 generates or updates one or more associated query files 116.

Referring to FIG. 3, the system 300 can use prior search criteria to identify those queries that could have lead to an impression of an advertisement. For example, the system 300 may evaluate historical search criteria to identify negative keywords without relying on search criteria that resulted in an actual impression of an ad. In doing so, the system 300 may not rely on historical data associated with an ad to identify negative keywords.

In combination with some of the elements in FIG. 1, the memory 110 includes reverse lookup tables 302 and search log files 304. In this implementation, he processor 112 includes a mapping engine 306. The reverse lookup tables 302 can include any parameters, variables, algorithms, instructions, rules, objects or other directives for mapping keywords to other keywords. More specifically, the reverse look-up tables 302 can be used to identify, from a given keyword, other related keywords. Generally, the reverse lookup tables 302 can be used to broaden a given keyword and identify related search criteria even in cases when the search criteria does not include one of the keywords. For example, a givenkeyword may be associated with (i.e., mapped using the reverse look-up tables) to a set of words related to the same topic. The reverse lookup tables 302 include directives, links, associations or the like for reversing this mapping processes to identify additional keywords. In some implementations, the reverse lookup tables 302 can be formatted, stored, or defined as various data structures in text files, XML documents, VSAM files, flat files, Btrieve files, CSV files, internal variables, or one or more libraries. In short, the reverse lookup tables 302 can comprise one table or file or a plurality of tables or files stored on one computer or across a plurality of computers in any appropriate format. Moreover, the reverse lookup tables 302 can be local or remote without departing from the scope of this disclosure and store any type of appropriate data. One example of a system that provides relationships between keywords is provided in, for example, U.S. patent application Ser. No. 10/676,571, filed Sep. 30, 2003, entitled "Method and Apparatus for Characterizing Documents Based on Clustering of Related Words," assigned to the assignee of the present application and hereby incorporated by reference in its entirety.

The search log files 304 include one or more data structures or entries that identify or include prior search criteria and associated ad impressions. For example, the search log file 304 can include or identify search criteria and one or more ads displayed with the associated search results. In some implementations, the search log files 304 can be formatted, stored, or defined as various data structures in text files, XML documents, VSAM files, flat files, Btrieve files, CSV files, internal variables, or one or more libraries. In short, the log files 304 can comprise one table or file or a plurality of tables or files stored on one computer or across a plurality of computers in any appropriate format. Moreover, the log files 304 can be local or remote without departing from the scope of this disclosure and store any type of appropriate data.

The mapping engine 306 can include any software, hardware, and/or firmware operable to identify search criteria associated with keywords. For example, the query engine 204 may identify search criteria in the log files 304 that include one or more of the keywords. In general, the mapping engine 306 performs one or more of the following: identifying previous search criteria including one or more of the keywords and/or mapping keywords located in the previous search criteria to other keywords using the reverse lookup index 302.

In one aspect of operation, the mapping engine 306 identifies one or more keyword files 114 associated with an advertisement. Using terms and/or phrases included in the identified keyword files 114, the mapping engine 306 maps the keywords to other keywords using the reverse lookup index 304. The mapping engine 306 identifies previous search criteria including either the initial and/or mapped keywords. Based, at least in part, on the identified search criteria, the mapping engine 306 generates or updates one or more associated query files 116.

Figure 4:
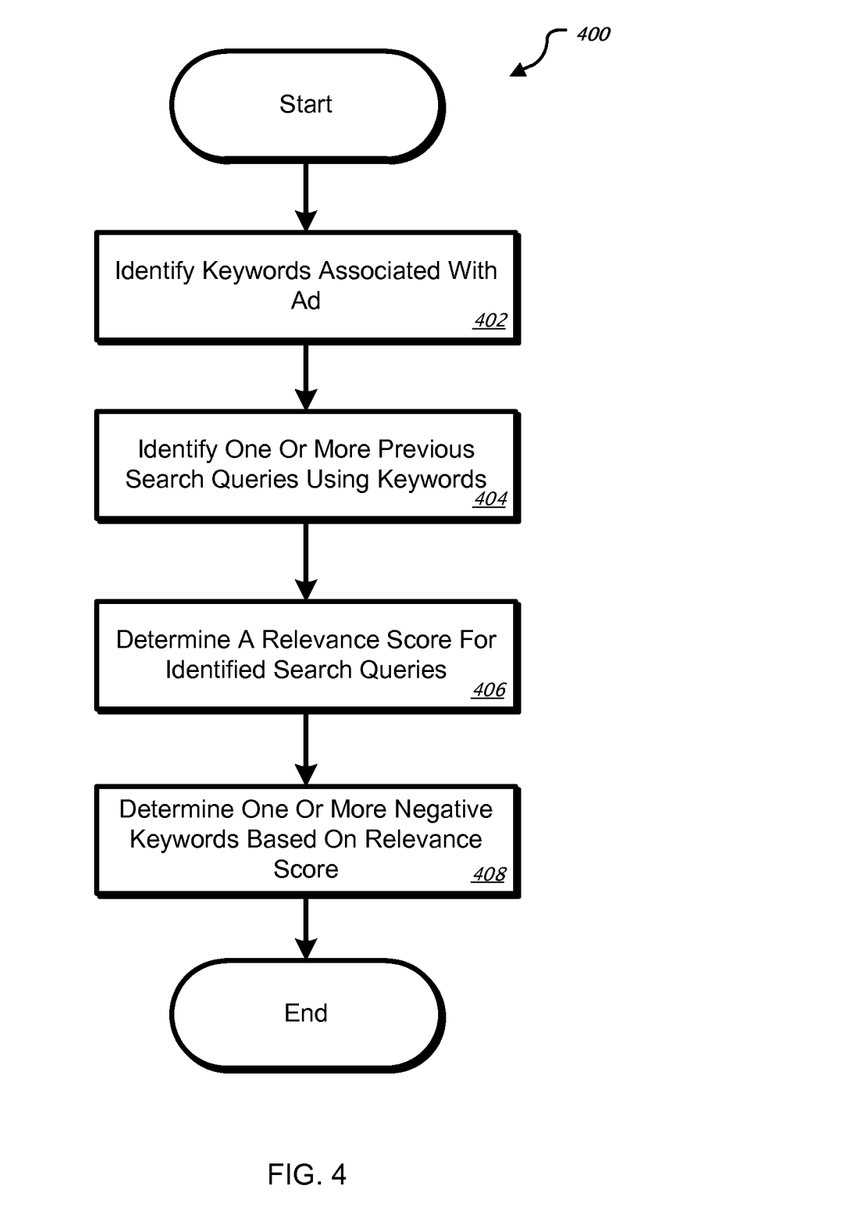
FIG. 4 is a flow diagram illustrating an example method for identifying negative keywords in the system of FIG. 1.

FIG. 4 is a flow diagram illustrating an example method 400 for identifying negative keywords in the system of FIG. 1. Generally, method 400 describes an example technique for evaluation engine 126 to determine negative keywords based on previous search criteria. The following descriptions will primarily focus on the operation of the evaluation engine 126 in performing this method. But system 100 contemplates using any appropriate combination and arrangement of logical elements implementing some or all of the described functionality.

At a high level, method 400 performs two processes: (1) identify keywords associated with ads and search criteria in steps 402 and 404; and (2) assign a relevance score to determine negative keywords for the search criteria in steps 406 and 408. Method 400 begins in step 402 where keywords associated with one or more advertisements are identified. For example, the evaluation engine 126 can identify keywords initially provided by an advertiser for a particular advertisement. Next, one or more previous search criteria using the keywords are identified at step 404. For example, the evaluation engine 126 can identify, using the initial keywords, search criteria that would invoke presentation of the advertisement. At step 406, a relevance score is determined for one or more (i.e., all identified search criteria located in step 404) of the identified search criteria. For example, the evaluation engine 126 can determine the relevance score using mathematical and/or logical expressions that analyze the search query for the presence or absence of specific query term(s), term frequency, popularity of the documents (e.g., a query independent score of the document's importance or popularity or interconnectedness), proximity of the query terms to each other, proximity of terms to topic of the advertisement, context, attributes, and others to categorize the relevance of the queries.

Now turning to the process of determining negative keywords, in step 408, one or more negative keywords are determined based, at least in part, on the assigned relevance scores from step 406. For example, the evaluation engine 126 can identify those terms with relatively low relevance scores and identify those terms as negative keywords. In doing so, the evaluation engine 126 can generate or update the negative keywords 122 in accordance with the determination.

Figure 5:
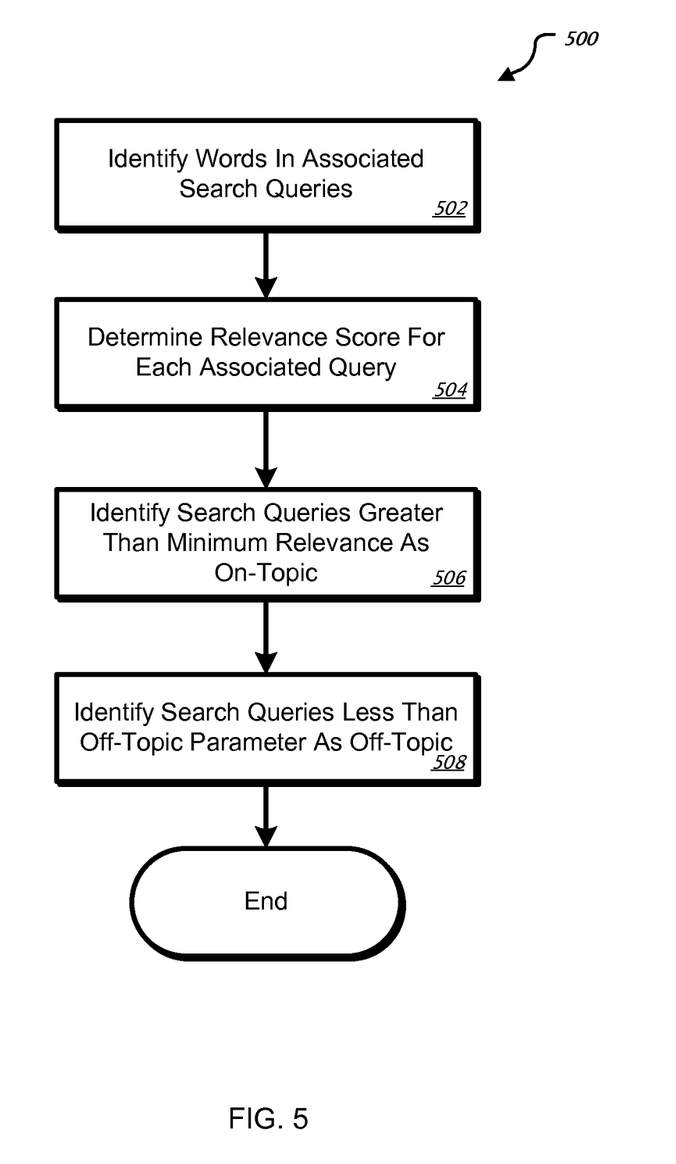
FIG. 5 is a flow diagram illustrating an example method for identifying off topic search criteria in the system of FIG. 1.

FIG. 5 is a flow diagram illustrating an example method 500 for identifying off-topic queries in system 100 of FIG. 1. Generally, method 500 describes an example technique for evaluation engine 126 to determine off-topic search criteria based on proximity to a topic of an advertisement. The following descriptions will primarily focus on the operation of evaluation engine 126 in performing this method. But system 100 contemplates using any appropriate combination and arrangement of logical elements implementing some or all of the described functionality.

Method 500 begins at step 502 where words included in search criteria associated with keywords of an advertisement are identified. At 504, a relevance score is determined for each of the associated search criteria. Search criteria having a relevance score greater than a minimum relevancy parameter are identified as on-topic at step 506. Next, at step 508, search criteria with a relevance score less than an off-topic parameter are identified as off-topic.

Figure 6:
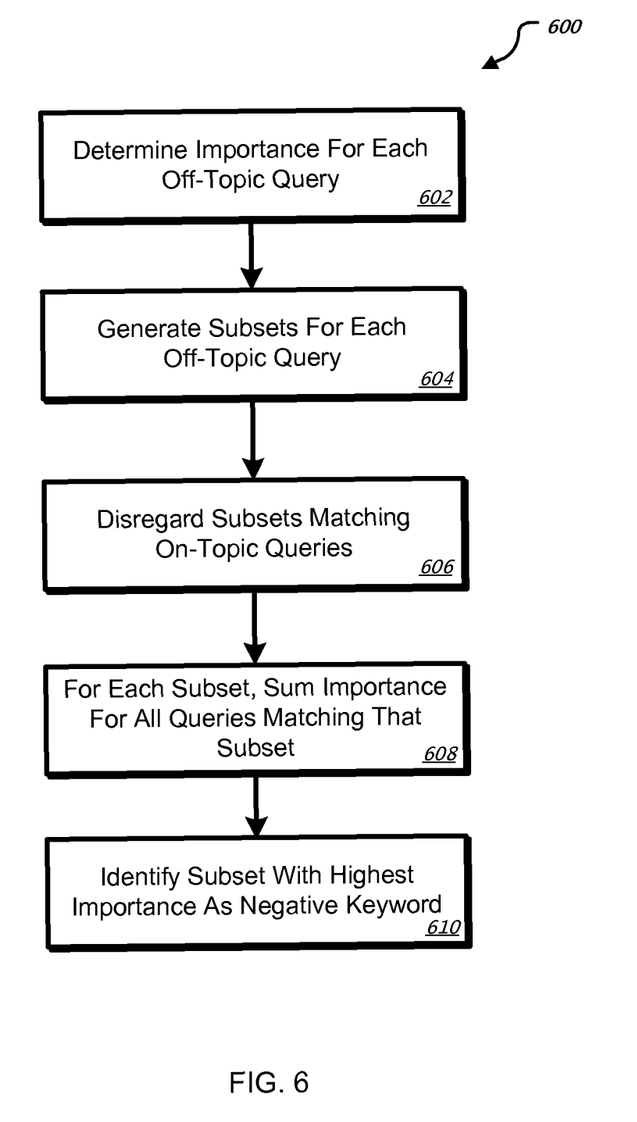
FIG. 6 is flow diagram illustrating an example method for identifying negative keywords using off topic search criteria in the system of FIG. 1.

FIG. 6 is a flow diagram illustrating an example method 600 for identifying negative keywords using subsets of the off-topic search criteria of FIG. 1. Generally, method 600 describes an example technique for evaluation engine 126 to determine negative keywords based on proximity to a topic of an advertisement. The following descriptions will primarily focus on the operation of evaluation engine 126 in performing this method. But system 100 contemplates using any appropriate combination and arrangement of logical elements implementing some or all of the described functionality.

Method 600 begins at step 602 where an importance value is determined for each off-topic query. Next, at step 604, subsets of words are generated for each off-topic query. Subsets matching on-topic queries are disregarded at step 606. For each subset, the importance for all queries matching that subset can be evaluated (e.g., summed, aggregated) at step 608. One or more subsets having scores above a threshold can be identified as a negative keyword at step 610. For example, a proximity threshold may be used to identify a subset's proximity to a topic of an advertisement. In one implementation, only the subset having the highest importance is identified as a negative keyword.

A number of implementations of the invention have been described. Nevertheless, it will be understood that various modifications can be made without departing from the spirit and scope of the invention. For example, the systems and methods in this disclosure can include inquiring about keywords or negative keywords to a user or another advertiser in the same field rather than determining the keywords and negative keywords. Accordingly, other implementations are within the scope of the following claims

What is claimed is:

1. A computer-implemented method comprising:
   receiving, from a first data storage device, data encoding an advertisement item and a log comprising a plurality of previously submitted search criteria,
      wherein each search criterion comprises one or more terms, and
      wherein when the search criterion was evaluated, the advertisement item was presented in a corresponding search result webpage;
   analyzing the plurality of previously submitted search criteria to identify one or more negative keywords including:

identifying, from the plurality of previously submitted search criteria, a subset of search criteria as being off-topic to the advertisement item, and deriving the one or more negative keywords from the subset of off-topic search criteria;

generating one or more files including the one or more negative keywords, the one or more negative keywords being used to prevent the advertisement item from being presented in a search result corresponding to a later submitted search criterion containing at least one of the identified negative keywords; and storing the one or more files on the first data storage device or a second data storage device.

2. The method of claim 1, further comprising: selecting the negative keywords to increase a number of search criteria identified as being off-topic to the advertisement item.

3. The method of claim 2, wherein selecting the negative keywords to increase the number of search criteria identified as being off-topic to the advertisement item maximizes the number of search criteria identified as being off-topic to the advertisement item.

4. The method of claim 1, further comprising: selecting the negative keywords to decrease the number of search criteria not identified as being off-topic to the advertisement item.

5. The method of claim 1, wherein selecting the negative keywords to decrease the number of search criteria not identified as off-topic to the advertisement item minimizes the number of search criteria not identified as being off-topic to the advertisement item.

6. The method of claim 1, wherein identifying the subset of search criteria as being off-topic to the advertisement item comprises:

associating, with each of the plurality of search criteria, a relevance score, and if the relevance score is under a threshold relevance value, assigning the associated search criterion as being off-topic.

7. The method of claim 6, wherein the relevance score includes an average logarithmic odds that a term of the associated search criterion occurs in a set of keyword clusters associated with a topic of the advertisement item.

8. The method of claim 1, wherein deriving the one or more negative keywords from the subset of off-topic search criteria comprises:

identifying subsets of words in each of the off-topic search criteria;

associating each subset of words with an importance metric; and summing the associated importance metric for each occurrence of the subset of words in the off-topic search criteria.

9. The method of claim 8, wherein the importance metric is determined by multiplying a confidence number by an amount of impressions associated with a set of keyword clusters that in turn are associated with the advertisement item, the confidence number representing a confidence that the identified off-topic search criterion is not relevant to a set of keyword clusters associated with a topic of the advertisement item.

10. The method of claim 8, wherein deriving the one or more negative keywords from the subset of off-topic search criteria further comprises:

when the summed importance metric is above a threshold importance value, assigning the subset of words as negative keywords.

11. The method of claim 8, deriving the one or more negative keywords from the subset of off-topic search criteria further comprises:

assigning the subset of words with the highest summed importance metric as negative keywords.

12. A non-transitory computer-readable medium having instructions stored thereon, which, when executed by at least one processor, cause the processor to perform operations comprising:

receiving, from a first data storage device, data encoding an advertisement item and a log comprising a plurality of previously submitted search criteria, wherein each search criterion comprises one or more terms, and wherein when the search criterion was evaluated, the advertisement item was presented in a corresponding search result webpage;

analyzing the plurality of previously submitted search criteria to identify one or more negative keywords including:

identifying, from the plurality of previously submitted search criteria, a subset of search criteria as being off-topic to the advertisement item, and deriving the one or more negative keywords from the subset of off-topic search criteria;

generating one or more files including the one or more negative keywords, the one or more negative keywords being used to prevent the advertisement item from being presented in a search result corresponding to a later submitted search criterion containing at least one of the identified negative keywords; and storing the one or more files on the first data storage device or a second data storage device.

13. The computer-readable medium of claim 12, wherein the operations further comprise: selecting the negative keywords to increase a number of search criteria identified as being off-topic to the advertisement item.

14. The computer-readable medium of claim 13, wherein selecting the negative keywords to increase the number of search criteria identified as being off-topic to the advertisement item maximizes the number of search criteria identified as being off-topic to the advertisement item.

15. The computer-readable medium of claim 12, wherein the operations further comprise: selecting the negative keywords to decrease the number of search criteria not identified as being off-topic to the advertisement item.

16. The computer-readable medium of claim 15, wherein selecting the negative keywords to decrease the number of search criteria not identified as being off-topic to the advertisement item minimizes the number of search criteria not identified as being off-topic to the advertisement item.

17. The computer-readable medium of claim 16, wherein identifying the subset of search criteria as being off-topic to the advertisement item comprises:

associating, with each of the plurality of search criteria, a relevance score, and if the relevance score is under a threshold relevance value, assigning the associated search criterion as being off-topic.

18. The computer-readable medium of claim 17, the relevance score includes an average logarithmic odds that a term of the associated search criterion occurs in a set of keyword clusters associated with a topic of the advertisement item.

19. The computer-readable medium of claim 12, wherein deriving the one or more negative keywords from the subset of off-topic search criteria comprises:

identifying subsets of words in each of the off-topic search criteria;

associating each subset of words with an importance metric; and summing the associated importance metric for each occurrence of the subset of words in the off-topic search criteria.

20. The computer-readable medium of claim 19, wherein the importance metric is determined by multiplying a confidence number by an amount of impressions associated with a set of keyword clusters that in turn are associated with the advertisement item, the confidence number representing a confidence that the off-topic search criterion is not relevant to a set of keyword clusters associated with a topic of the advertisement item.

21. The computer-readable medium of claim 19, wherein deriving the one or more negative keywords from the subset of off-topic search criteria further comprises:

when the summed importance metric is above a threshold importance value, assigning the subset of words as negative keywords.

22. The computer-readable medium of claim 19, wherein deriving the one or more negative keywords from the subset of off-topic search criteria further comprises:

assigning the subset of words with the highest summed importance metric as negative keywords.

23. A server for identifying negative words, comprising one or more processors, a memory coupled to the one or more processors, and a network interface, the one or more processors configured to:

receive data encoding an advertisement item and a log comprising a plurality of previously submitted search criteria, wherein each search criterion comprises one or more terms, and wherein when the search criterion was evaluated, the advertisement item was presented in a corresponding search result webpage;

evaluate the plurality of previously submitted search criteria to identify one or more negative keywords by:

identifying, from the plurality of previously submitted search criteria, a subset of search criteria as being off-topic to the advertisement item, and deriving the one or more negative keywords from the subset of off-topic search criteria;

generate one or more files including the one or more negative keywords, the one or more negative keywords prevent the advertisement item from being presented in a search result corresponding to a later submitted search criterion containing at least one of the identified negative keywords; and store the one or more files on computer-readable media.

24. The server of claim 23, wherein the one or more processors are further configured to select the negative keywords to increase the number of search criteria identified as being off-topic to the advertisement item.

25. The server of claim 24, wherein the one or more processors are further configured to select the negative keywords to further maximize the number of search criteria identified as being off-topic to the advertisement item.

26. The server of claim 23, wherein the one or more processors are further configured to select the negative keywords to decrease the number of search criteria not identified as being off-topic to the advertisement item.

27. The server of claim 26, wherein the one or more processors are further configured to select the negative keywords to further minimize the number of search criteria not identified as being off-topic to the advertisement item.

28. The server of claim 23, wherein the one or more processors are further configured to identify, from the plurality of search criteria, the subset of search criteria as being off-topic to the advertisement item by:

associating, with each of the plurality of search criteria, a relevance score, and if the relevance score is under a threshold relevance value, assigning the associated search criterion as being off-topic.

29. The server of claim 28, wherein the relevance score include an average logarithmic odds that a term of the associated search criterion occurs in a set of keyword clusters associated with a topic of the advertisement item.

30. The server of claim 23, wherein the one or more processors are further configured to derive the one or more negative keywords from the subset of off-topic search criteria by:

identifying subsets of words in each of the off-topic search criteria;

associating each subset of words with an importance metric; and summing the associated importance metric for each occurrence of the subset of words in the off-topic search criteria.

31. The server of claim 30, wherein the importance metric is determined by multiplying a confidence number by an amount of impressions associated with a set of keyword clusters that in turn are associated with the advertisement item, the confidence number representing a confidence that the off-topic search criterion is not relevant to a set of keyword clusters associated with a topic of the advertisement item.

32. The server of claim 30, wherein the one or more processors are further configured to derive the one or more negative keywords from the subset of off-topic search criteria by:

if the summed importance metric is above a threshold importance value, assigning the subset of words as negative keywords.

33. The server of claim 30, wherein the one or more processors are further configured to derive the one or more negative keywords from the subset of off-topic search criteria by:

assigning the subset of words with the highest summed importance metric as negative keywords.

* * * * *